July 4, 1939.  L. S. RANDOLPH  2,164,473
APPARATUS AND METHOD FOR RECORDING RAILROAD SPEED SIGNAL OBSERVANCE
Filed July 30, 1937  2 Sheets-Sheet 2
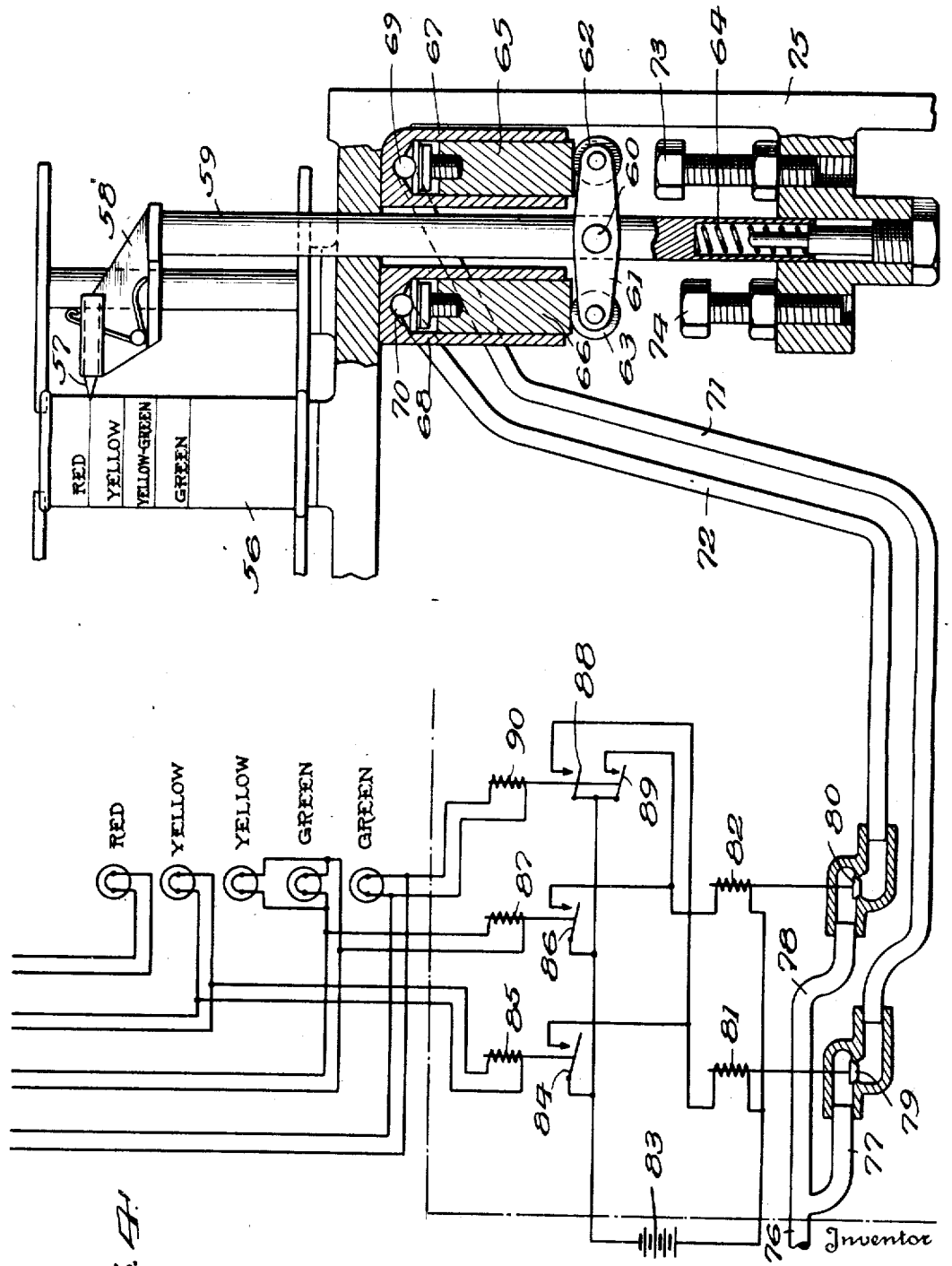

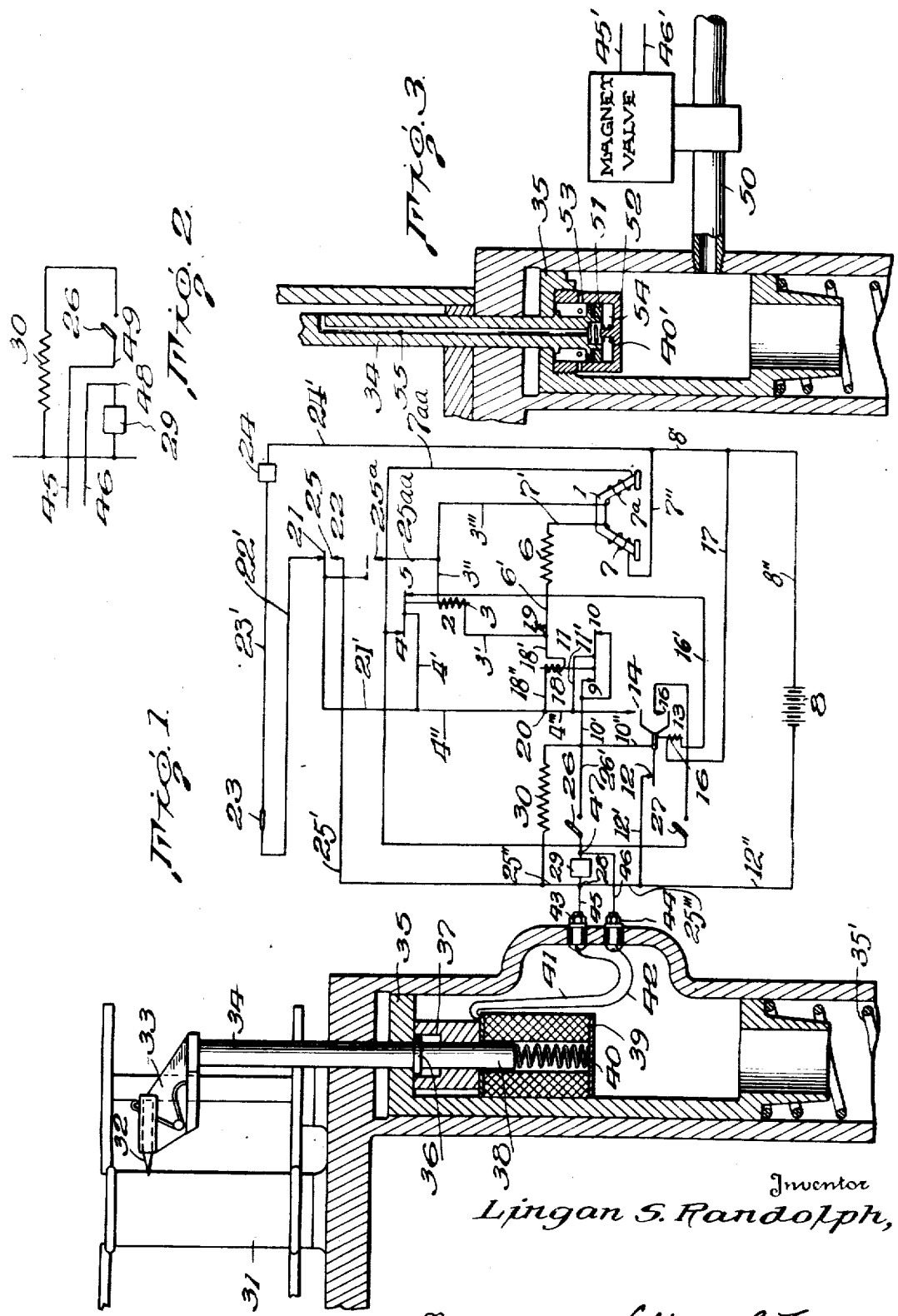

Patented July 4, 1939

2,164,473

UNITED STATES PATENT OFFICE 2,164,473

APPARATUS AND METHOD FOR RECORDING RAILROAD SPEED SIGNAL OBSERVANCE

Lingan S. Randolph, Lexington, Va.

Application July 30, 1937, Serial No. 156,580

15 Claims. (Cl. 246—185)

My invention relates to improvements in apparatus and methods for recording railroad speed signal observance, and particularly to improvements in apparatus and methods for making a record of train operations.

In present day railroad signalling systems automatic equipment has been provided whereby an engineman is required to keep the speed of his train within certain prescribed limits depending upon conditions on the railroad right-of-way, and automatic equipment is provided for applying the train brakes should the engineman fail to observe the speed restrictive signals. However, it has also been realized that considerable discretion must be allowed to the engineman in the operation of his train and provisions are usually made therefore to permit the engineman, upon occasion, to forestall the automatic application of the brakes. The necessity therefore arises of obtaining a record of signal conditions, as well as the engineman's response thereto, which record should be of a permanent nature and furnish sufficient information to act as a check upon the engineman.

It is accordingly one object of my invention to provide means and methods for recording signal conditions so as to obtain a permanent record for use by supervising officials in enforcing observance of rules. It is also an object of my invention to provide improved means and methods for recording the engineman's response to restrictive speed signal indications, and particularly for recording his action in forestalling the automatic application of the train brakes because of such signalling. It is a further object of my invention to obtain a continuous record of signal conditions wherein the permissible speed is indicated at all times. Another object of my invention is to obtain a record of forestalling action by the engineman in combination with a record of speed or other operating functions of the train. Further objects will be apparent from the consideration of the following description of my invention and the claims appended hereto.

My invention can best be understood from a consideration of the drawings which are attached hereto. In these drawings:

Fig. 1 represents an embodiment of my invention as applied to a train control circuit, in which embodiment use is made of electro-magnetic means for operating the recording mechanism.

Fig. 2 represents a modification which may be made in the electrical circuit of Fig. 1.

Fig. 3 shows the possible substitution of electro-pneumatic means for the electromagnetic means of Fig. 1.

Fig. 4 illustrates my invention embodied in a device located in an engineman's cab for recording signal conditions in a four-aspect signalling system.

In the drawings (Fig. 1), the reference numeral 1 designates the inductive receiver which is located on the engine in close proximity to the roadbed. 2 represents an electrical relay with magnetic operating coil 3 and contacts 4 and 5, coil 3 of said relay being included in series with wires 3' and 6', ballast resistor 6, wire 7', coil 7 of the receiver 1, wires 7'', 8', and 8'' to one side of a source of electrical energy such as battery 8. The other side of coil 3 may be connected in series with wires 3'' and 3''', coil 7a of receiver 1, wire 7aa, contact 4 of relay 2, wires 4', 4'', 4''', and 11', contacts 9 and 10 of relay 11, wires 10' and 10'', contact 12 of relay 13, and wires 12' and 12'' to the other side of the battery 8. Relay 13 is provided with the insulated and normally open contacts 14 and 15 as well as with a magnetic coil 16. One side of the magnetic coil 16 is connected directly by wires 17 and 8'' with one side of battery 8 while the other side of coil 16 is connected by wire 16' to contact 5 of the relay 2. Relay 11 is also provided with magnetic coil 18, which magnetic coil may be connected parallel with magnetic coil 3 of relay 2 by means of wires 18' and 18'' as at 19 and 20 respectively. Also connected at 20 is a circuit including wire 4'', wire 21', normally closed contact 21 of reset contactor 22, wire 22', switch 23, wire 23', electro-pneumatic valve 24, and wires 24', 8' and 8'' back to one side of battery 8. Reset contactor 22 is also provided with normally open contacts 25 and 25a, contact 25 being connected with battery 8 by means of wires 25', 25'', 25''', and 12'', and 25a being connected by wire 25aa to the circuit between coil 3 of relay 2 and coil 7a of receiver 1. The switch 23 is associated with the forestalling apparatus which also includes switches 26 and 27. Closing of switch 26 completes the circuit from one side of battery 8 through wires 12'' and 25''' to point 28 through whistle valve 29, wires 26' and 10' to contacts 9 and 10 of relay 11. 30 designates a resistance of high value designed to prevent excess sparking at contact 12 of relay 13.

The apparatus and circuit arrangements so far described are those found in one system of train control already in use. For understanding the application of my invention to such a system the operation of the apparatus already described will be briefly explained. Relay 2 is normally closed by current from battery 8 passing through coil 7 of the receiver 1, resistor 6, coil 3 of relay 2, coil 7a of receiver 1, contact 4 of relay 2, contacts 9 and 10 of relay 11, and contact 12 of relay 13. Relay 13 is thereby maintained closed by current from battery 8 passing through contact 5 of relay 2, and relay 11 is maintained closed since its coil 18 forms a direct shunt between points 19 and 20. When, however, receiver 1 comes adjacent an open circuited track inductor (indicating a danger condition) normally employed with such a system, electrical current is produced in coil 7a opposing and reducing that voltage normally applied across the coil 3, whereby relay 2 is opened. The opening of contact 4 of relay 2 maintains this relay open, while the opening of contact 5 breaks the circuit of coil 16 of relay 13 thereby releasing this relay also. As a result of the opening of contact 12 of relay 13 the circuits for relay 11 and electro-pneumatic valve 24 are likewise opened, the latter effecting an automatic actuation of the train brakes. When such an automatic actuation of the train brakes has once been effected it is necessary to operate the reset contactor 22 in order to release the brakes and reset the relays. Reset contactor 22 is ordinarily so located on the locomotive as to permit its operation only from the ground after the train has been brought to a stop. Operation of this contactor opens the electro-pneumatic valve circuit at contact 21 and closes contacts 25 and 25a. Such closing of contact 25 completes a circuit from battery 8 through coil 18 of relay 11 to effect the closing of this relay. Similarly closing of contact 25a results in an application of voltage to coil 3 thereby effecting the closing of relay 2 which in turn completes the circuit for relay 13. Relays 2, 11 and 13 therefore reassume their normal positions as shown and subsequent release of reset contactor 22 results in the application of voltage to the electro-pneumatic valve 24 to close same and thereby release the brakes.

Instead of allowing the automatic operation of brakes to take place as described above the engineman may forstall such action by closing switches 26 and 27. In this event while relays 2 and 13 will operate as before to open contacts 4, 5 and 12, the prior closing of switch 26 will function to maintain voltage across coil 18 of relay 11 to maintain this relay in the closed position as shown. At the same time closing of switch 27 will be effective through the now closed contacts 14 and 15 of relay 13 to feed operating current to relay 2 causing this relay to close, which in turn will effect the closing of relay 13 thus restoring the relay circuits to their normal condition as shown. Closing of switch 26 when contact 12 of relay 13 is open is also effective to complete the circuit through whistle valve 29 which will sound indicating that the forestalling device has been operated to prevent an automatic operation of the braking system. To prevent the engineman from tying down the forestalling device or otherwise operating it improperly the switch 23 is customarily provided in connection with the forestalling apparatus, this switch being provided for automatically opening a predetermined interval after the forestalling device has been operated, the delay interval being so chosen as to provide only sufficient time for the engineman to release the forestalling device after same has been actuated to prevent an automatic train stop. Opening of switch 23 of course opens the circuit of the electro-pneumatic valve 24 thereby effecting the operation of the train braking system.

The above description of the type of automatic train control with which my invention is designed to operate is not intended, of course, to be exhaustive, such systems often containing other details such as for example two sets of forestalling equipment connected in series for use by the engineman and fireman respectively. It is thought, however, that the above description will suffice to show the application of my invention to such a system, which application I will now proceed to describe.

As a part of the engine equipment recorders are sometimes provided for making a permanent record of train operating functions such as speed, cut-off, etc. Such a recorder is shown in Fig. 1 and includes the usual clock-work or otherwise driven chart 31 upon which a record is made by pencil 32 supported in a holder generally designated at 33. Holder 33 in turn is supported upon operating rod 34 driven by the recorder tailpiece 35 in response to the function which is desired to be recorded. The usual manner of driving such a recorder tailpiece is by moving the latter against the force of spring 35' by the pull of a conduit-enclosed cable (not shown) connected with a speed responsive device, or the valve gear mechanism of the locomotive, depending upon whether "speed" or "cut-off" are to be recorded. This cable connection is well known in the art, and is not part of the subject matter of the present invention. Secured to operating rod 34 is a collar 36 operating in cylinder 37 secured to tailpiece 35. Operating rod 34 projects through and beyond the cylinder 37 as at 38 to form a movable core of a solenoid 39. The solenoid when energized is effective to pull down the operating rod 34 against the action of spring 40. The collar 36 is effective to limit the amount of relative motion between the operating rod 34 and the recorder tailpiece 35. Extending from the solenoid 39 are the electrical leads 41 and 42 brought out through insulated studs 43 and 44 to be connected at 28 and 47 by wires 45 and 46 to the electrical circuit previously described. Sufficient slack is provided in conductors 41 and 42 to permit the movement of tailpiece 35 with respect to its housing.

When, therefore, the forestalling device 23—26—27 is operated to prevent automatic operation of the braking system, voltage will be applied not only to actuate the whistle valve 29 but also to energize solenoid 39 to produce a distinctive indication on the line produced by pencil 32 to establish a permanent record of such operation. Actuation of the forestalling device at any other time, however, will not result in the energizing of solenoid 39. It will therefore be seen that my invention as thus far described results in the combined recording of some function of train operation such as speed, cut-off, etc., with a record of some other function of train operation such as the operation of the forestalling device, but only when such latter operation is in response to a restrictive signal.

In Fig. 2 is shown a modification of the application of my invention to the arrangement shown in Fig. 1, in that the solenoid 39 instead of being connected in parallel with the whistle valve 29 as in Fig. 1 may be connected in series therewith as shown at 48 and 49 between switch 26 and whistle valve 29. Operation of this modification, similarly to that of Fig. 1, results in obtaining a record of the actuation of the forestalling device each time, but only when, such actuation is effective to prevent an automatic train stop.

Fig. 3 illustrates another way in which the embodiment of my invention may be modified by the substitution of electro-pneumatic means for the electro-magnetic means of Fig. 1. In Fig. 3 the housing for the recorder tailpiece 35 is made airtight and a conduit 50 provided for supplying air under pressure from a reservoir of the air brake system to the interior of the tailpiece housing. The recorder operating rod 34 has secured to its lower end a piston 51 operating in a cylinder 52 secured to the tailpiece 35. Ports 53 are provided in cylinder 52 for supplying air under pressure above piston 51. For relieving the air pressure within the space 54 below piston 51 a vent 55 is provided in the rod 34. Passage of air through the pipe 50 is controlled by a magnet valve energized by electrical current fed through wires 45' and 46', which may be connected in the electrical circuit of either Fig. 1 or Fig. 2 to replace 45 and 46 shown therein.

In operation of this embodiment of my invention application of operating voltage to the whistle valve 29 will simultaneously energize the magnet valve to admit compressed air to the recorder tailpiece housing. Such air passing through the ports 53 will operate to force down the piston 51 and operating rod 34 connected thereto against the action of spring 40' to produce the distinctive indication in the line traced by pencil 32 as explained above in connection with the operation of the arrangement shown in Fig. 1.

A further embodiment of my invention will be found in Fig. 4 in which means are shown for obtaining a permanent and continuous record of signal conditions. In Fig. 4 56 designates a recording chart upon which a record is traced by pencil 57 mounted on holder 58, which holder in turn is secured to operating rod 59. At point 60 is pivotally mounted a rocker arm 61 bearing at either extremity rollers 62 and 63. By means of the spring 64 the operating rod 59 is normally held in its uppermost position with rollers 62 and 63 bearing upon pistons 65 and 66 respectively, which pistons operate in cylinders 67 and 68. At the upper end of cylinders 67 and 68 are provided ports 69 and 70 to which compressed air may be supplied by means of conduits 71 and 72. For limiting the downward travel of rollers 62 and 63 I have provided adjustable stops 73 and 74 secured to the main frame 75 of the recorder. Compressed air under pressure is supplied to conduit 76 from which it is conducted by branch conduits 77 and 78 to valves 79 and 80, which valves control the supply of air under pressure to conduits 71 and 72 respectively. For operating the valves 79 and 80 solenoids 81 and 82 are provided. Solenoid 81 may be energized by current from a battery or other source of electrical current 83 by a normally open switch 84, which switch may be closed by solenoid 85 when the latter is energized from the "yellow" signal circuit of the cab signal device. Similarly solenoid 82 may be energized by the closing of switch 86 operated by solenoid 87 the latter being energized by the "yellow-green" cab signal circuit. In parallel with switches 84 and 86 I have also provided switches 88 and 89 which may be simultaneously closed by solenoid 90 when the latter is energized by the "green" cab signal circuit, thereby simultaneously opening both valves 79 and 80.

The apparatus described in Fig. 4 operates as follows to obtain a record of the so called "four-aspect" signalling: When the "red" signal circuit is energized the recorder takes the position as shown in Fig. 4 to trace a line at the top of the record chart 56. When however the "yellow" cab signal circuit is energized solenoid 85 is likewise actuated to close switch 84, energizing in turn solenoid 81 to open valve 79. Air under pressure is then admitted from the source of supply through conduits 76, 77 and 71 through the upper end of cylinder 67 thus forcing piston 65 in a downward direction. The roller 63 then acts as a fulcrum on piston 66 while the arm 61 pivots on the point 60 permitting downward movement of the operating rod 59 until roller 62 strikes stop 73. The recording pencil will now be pulled down to trace the line marked "yellow" on the recording chart 56. Operation of the "yellow-green" cab circuit to produce its record on chart 56 by a similar actuation of piston 66 in cylinder 68 will be at once apparent and needs no further explanation. Finally, when the "green" cab signal circuit is energized to close switches 88 and 89 thereby effecting the opening of both of valves 79 and 80 to produce a more extended movement of the operating rod 59, pencil 57 will trace the "green" line on the chart 56. Stops 73 and 74 may be adjusted to vary the registration of pencil 57 on the chart 56 so that the line traced thereon will show at all times the permissible speed,—zero at the top, when the cab signal indicates "red", increasing by stages to the maximum speed allowed when the signal shows full-clear, i. e., "green". A comparison of the record so produced with the record of actual speed attained will serve as a check upon the engineman's response to restrictive signals.

From the above description of the illustrated embodiments of my invention it will be apparent that other modifications may be made in the structure and circuits without departing from the scope of my invention as covered by the appended claims.

I claim:

1. A method for recording train speed restriction observance comprising the steps of recording one function of train operation pertaining to speed of the train, and recording with respect to said first recording the time relation of action by the engineman in forestalling an automatic train stop, thereby to obtain the recording of effective speed signal observance by the engineman.

2. A method for recording train speed restriction observance comprising the steps of recording speed of the train, and recording with respect to said first recording the time relation of only such action by the engineman as is effective to forestall an automatic train stop, thereby to obtain the recording of effective speed signal observance by the engineman.

3. A method for recording train speed restriction observance comprising the steps of recording cut-off, and recording with respect to said first recording the time relation of only such action by the engineman as is effective to forestall an automatic train stop, thereby to obtain the recording of effective speed signal observance by the engineman.

4. In an automatic train control system, apparatus comprising means for effecting an automatic actuation of the brake system of the train when a danger signal is passed, means including manually operable means for rendering ineffective said first named means when a danger signal is passed, but effective to energize the brake system if said manually operable means is operated at any other time, and means for recording the operation of said second named means in rendering said brake system actuation effecting means ineffective, said last named means including means for preventing the recording of all other operations of said manually operable means.

5. In automatic train control apparatus comprising electrical means for automatically energizing the braking system of the train by disconnection of an applied electric voltage to close an electro-pneumatic valve and thereby cause the brakes to be applied; the combination therewith of an electrical circuit manually operable to maintain the application of voltage to said electro-pneumatic valve, said circuit comprising a manually operated switch and an indicator, a second circuit by-passing said first circuit and comprising a switch automatically opened by said electrical means when the latter functions to energize the braking system, and a recorder associated with said indicator, whereby, when said automatically opened switch is opened, prior operation of said manually operated switch will be effective to forestall operation of the automatic train control and at the same time said indicator and recorder will be actuated to obtain a record of such forestalling action.

6. In a train operation recorder comprising a chart driven transversely with respect to a marking pencil, an operating rod connected to drive said pencil, and means for moving said operating rod in response to one variable function of train operation to thereby obtain a recordation of said function; said rod moving means including an element movable in response to said function, a resilient connection between said element and said rod for urging said rod in one direction with respect to said element, and means electrically actuated in response to a second variable function of train operation to move said rod in a direction opposing said resilient connection to thereby superimpose a recordation of said second function upon said first recordation.

7. Apparatus as defined in claim 6 in which the means electrically actuated in response to a second variable are electro-pneumatic means.

8. Apparatus as defined in claim 6 in which the means electrically actuated in response to a second variable are electro-magnetic means.

9. In a train operation recorder comprising a chart driven transversely with respect to a marking pencil, an operating rod connected to drive said pencil, and means for moving said operating rod in response to one variable function of train operation to thereby obtain a recordation of said function; said rod moving means including an element movable in response to said function, a resilient connection between said element and said rod for urging said rod in one direction with respect to said element, said resilient connection including a cylinder secured to said element, a piston operating in said cylinder and secured to said rod, means for supplying fluid under pressure to said cylinder to move said rod in a direction opposing said resilient connection, electrical means for actuating said fluid supplying means in response to a second variable function of train operation, whereby a recordation of said second function will be superimposed upon said first recordation.

10. In a train operation recorder comprising a chart driven transversely with respect to a marking pencil, an operating rod connected to drive said pencil, and means for moving said operating rod in response to one variable function of train operation to thereby obtain a recordation of said function; said rod moving means including an element movable in response to said function, a resilient connection between said element and said rod for urging said rod in one direction with respect to said element, said resilient connection including an electrical solenoid secured to said element in operative relation with said rod, and means for actuating said solenoid in response to a second variable function of train operation, whereby said rod is moved in a direction opposing said resilient connection to thereby superimpose a recordation of said second function upon said first recordation.

11. In a train operation recorder comprising a chart driven transversely with respect to a marking pencil, and an operating rod connected to drive said pencil; means secured to said rod for actuating said rod, means operatively engaging said first named means for actuating said first named means in response to one variable function of train operation to thereby obtain a recordation of said function, second means operatively engaging said first named means for actuating said first named means in response to a second variable function of train operation and means for differentiating the actuation of said first named means by said two actuating means, whereby the records produced may be distinguishable the one from the other.

12. Apparatus for determining the alertness of an engineman in responding to danger signals in a system of automatic train control, comprising means for recording one function of train operation pertaining to speed of the train, and means for superimposing in time relation upon the record of said function so produced a record of the engineman's action in forestalling the actuation of an automatic braking system.

13. Apparatus for determining the alertness of an engineman in responding to danger signals in a system of automatic train control, comprising means for recording speed of the train, and means for superimposing in time relation upon the speed record so produced a record of the engineman's action in forestalling the actuation of an automatic braking system.

14. Apparatus for determining the alertness of an engineman in responding to danger signals in a system of automatic train control, comprising means for recording cut-off, and means for superimposing in time relation upon the cut-off record so produced a record of the engineman's action in forestalling the actuation of an automatic braking system.

15. In a train operation recorder comprising a recording device, and an operating rod connected to drive said device; a member pivoted at a point intermediate its ends to said rod, means engaging one end of said member for actuating the latter in response to one variable function of train operation, second means engaging the other end of said member for actuating the latter in response to a second variable function of train operation, each of said means including means serving as a fulcrum for said member during operation of the other said means, whereby movements of said member are imparted to said rod thereby to obtain recordings of both of said functions upon said chart, and means differentiating the actuation of said member by said two actuating means, whereby the records produced may be distinguishable the one from the other.

LINGAN S. RANDOLPH.

CERTIFICATE OF CORRECTION.

Patent No. 2,164,473.                              July 4, 1939.

LINGAN S. RANDOLPH.

It is hereby certified that error appears in the printed specification of the above numbered patent requiring correction as follows: Page 3, second column, lines 38 and 39, claim 1, strike out the words "action by the engineman in forestalling" and insert instead only such action by the engineman as is effective to forestall; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.